United States Patent [19]

Kawase et al.

[11] 3,953,539

[45] Apr. 27, 1976

[54] AROMATIC POLYESTER RESIN COMPOSITION HAVING INHIBITED COLORATION AND METHOD FOR INHIBITING COLORATION

[75] Inventors: Shoji Kawase; Takeo Shima; Hiroo Inata; Shizuka Kurisu, all of Iwakuni, Japan

[73] Assignee: Teijin Ltd., Osaka, Japan

[22] Filed: Mar. 25, 1974

[21] Appl. No.: 454,605

[30] Foreign Application Priority Data
Mar. 28, 1973  Japan.............................. 48-34648
Aug. 27, 1973  Japan.............................. 48-95118

[52] U.S. Cl. ........................... 260/860; 260/45.7 P; 260/863
[51] Int. Cl.²........................................ C08L 67/00
[58] Field of Search ...................... 260/860, 45.7 P

[56] References Cited
UNITED STATES PATENTS

| 3,000,849 | 9/1961 | Clachan............................. 260/860 |
| 3,218,372 | 11/1965 | Okamura............................ 260/860 |
| 3,313,862 | 4/1967 | Siggel................................ 260/860 |
| 3,470,114 | 9/1969 | Siggel................................ 260/860 |
| 3,752,866 | 8/1973 | Doerr................................. 260/860 |

OTHER PUBLICATIONS

Def. Pub., T878018, Jackson, 9/70.

*Primary Examiner*—Carman J. Seccuro
*Attorney, Agent, or Firm*—Sherman & Shalloway

[57] ABSTRACT

An aromatic polyester resin composition with inhibited coloration comprising (1) 100 parts by weight of an aromatic polyester resin composed mainly of tetramethylene arylcarboxylate units and polymerized by a titanium compound catalyst, (2) 5 to 100 parts by weight of a polycarbonate resin and (3) a coloration inhibiting amount of at least one phosphorus compound, and a method for inhibiting the coloring phenomenon of a resin composition comprising the polyester resin (1) and polycarbonate resin (2).

7 Claims, No Drawings

AROMATIC POLYESTER RESIN COMPOSITION HAVING INHIBITED COLORATION AND METHOD FOR INHIBITING COLORATION

This invention relates to a method for inhibiting the coloration of a composition comprising an aromatic polyester resin and a polycarbonate resin, and a composition comprising an aromatic polyester resin and a polycarbonate resin with inhibited coloration.

More specifically, this invention relates to an aromatic polyester resin composition with inhibited coloration, the composition comprising 1. 100 parts by weight of an aromatic polyester resin derived from a glycol component at least 70 mol % of which consists of tetramethylene glycol and an acid component at least 70 mol % of which consists of an aromatic dicarboxylic acid which are polymerized with a titanium compound catalyst,
2. 5 to 100 parts by weight of a polycarbonate resin, and
3. a coloration inhibiting amount of at least one phosphorus compound which is liquid or solid at room temperature selected from the group consisting of phosphorus compounds of the following formula

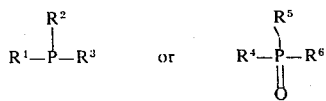

wherein each of $R^1$, $R^2$ and $R^3$, and each of $R^4$, $R^5$ and $R^6$ represent a hydrogen atom, an alkyl group containing 1 to 20 carbon atoms, an aryl group containing 6 to 20 carbon atoms, an aralkyl group containing 7 to 20 carbon atoms, or -OR group in which R is a hydrogen atom, an alkyl group containing 1 to 20 carbon atoms, an aryl group containing 6 to 20 carbon atoms, an aralkyl group containing 7 to 20 carbon atoms; $R^1$, $R^2$ and $R^3$, or $R^4$, $R^5$ and $R^6$ may be different from each other, or at least two of $R^1$, $R^2$ and $R^3$ or $R^4$, $R^5$ and $R^6$ may be the same, or at least two of $R^1$, $R^2$ and $R^3$, or $R^4$, $R^5$ and $R^6$ may form a ring, and metal salts of these phosphorus compound; and also to a method for inhibiting the coloration of such composition.

We made investigations with a view to improving the heat-distortion temperature of the above aromatic polyester resin by blending it with a polycarbonate resin, while retaining its high rate of crystallization, excellent moldability under normal molding conditions, and superior chemical resistance and abrasion resistance which make it suitable as a material for injection molding or extrusion molding. In the course of the investigations, we found that a blend composed of the aromatic polyester resin composed mainly of tetramethylene aryl dicarboxylate units described in (1) above and the polycarbonate resin described in (2) above assumes a yellow color. This coloring phenomenon was investigated, and we found that this is not an ordinary coloring phenomenon occurring as a result of the degradation of the polyester resin, but a coloring phenomenon which is not caused by the degradation of the polyester resin but occurs as a result of the mixing of the two resins. Further work and led to the discovery that this unique coloring phenomenon can be inhibited by incorporating in the blend of the polyester (1) and the polycarbonate (2) the specific phosphorus compound (3) in an amount far smaller than that required for exhibiting a fire-retarding effect. The phosphorus compounds (3) are known as stabilizers for inhibiting the degradation of the polyester resins such as poly(ethylene terephthalate) ascribable to the reaction catalyst such as calcium acetate or manganese acetate, and also overlap those phosphorus compounds which are generally known as fire-retarding agents.

Accordingly, an object of this invention is to provide an aromatic polyester resin composition comprising an aromatic polyester resin composed mainly of tetramethylene arylcarboxylate units and polymerized with a titanium compound catalyst, the heat distortion temperature of the aromatic polyester resin being improved without impairing the excellent properties of the polyester, and the coloring phenomenon incident to the achievement of this improvement having been inhibited.

Another object of this invention is to provide an effective method for inhibiting the coloring phenomenon of the aromatic polyester resin composition.

Many other objects of this invention along with its advantages will become apparent from the following description.

The aromatic polyester resin used in this invention is one obtained by polymerizing a glycol component at least 70 mol %, preferably at least 80 mol %, of which consists of tetramethylene glycol and an acid component at least 70 mol %, preferably at least 80 mol %, of which consists of an aromatic dicarboxylic acid in the presence of a titanium compound as a catalyst.

The glycol component can contain not more than 30 mol %, preferably not more than 20 mol %, of another glycol, such as ethylene glycol, trimethylene glycol, hexamethylene glycol, decamethylene glycol, cyclohexane dimethylol, or neopentylene glycol.

Examples of suitable aromatic dicarboxylic acids are terephthalic acids, naphthalenedicarboxylic acids, and polyester-forming derivatives thereof, for example, $C_1$–$C_3$ alkyl esters. Of these, terephthalic acid, naphthalene-2,6-dicarboxylic acid, and polyester-forming derivatives thereof are preferred. Specific examples include terephthalic acid, isophthalic acid, 2,6-naphthalenedicarboxylic acid, 2,7-naphthalenedicarboxylic acid, 1,5-naphthalenedicarboxylic acid, and polyester-forming derivatives thereof.

The acid component can contain not more than 30 mol %, preferably not more than 20 mol %, of another acid, such as 4,4'-diphenyldicarboxylic acid, 4,4'-diphenoxyethanedicarboxylic acid, p-hydroxybenzoic acid, sebacic acid, or adipic acid.

The aromatic polyester resin used in this invention preferably has an intrinsic viscosity [$\eta$] (measured in o-chlorophenol at 35°C.) of 0.3 to 1.5.

The aromatic polycarbonate used for the composition of this invention is preferably a polycarbonate of a di(monohydroxyphenyl-substituted) aliphatic hydrocarbon. For example, an aromatic polycarbonate derived by the ester-interchange process or phosgene process from 2,2-bis(4-hydroxyphenyl)-propane (to be referred to simply as bisphenol A), or 1,1'-bis(4-hydroxyphenyl)-cyclohexane (to be referred to as bisphenol Z) can be used. Furthermore, a part or whole of the bisphenol A may be replaced by a 4,4'-dihydroxydiphenyl alkane, 4,4'-dihydroxydiphenyl sulfone, or 4,4'-dihydroxydiphenyl ether. Also, two or more of such aromatic polycarbonates may be used in admixture.

Preferred polycarbonate resins have a number average molecular weight of 10,000 to 100,000.

In the present invention, the aromatic polyesters obtained by polymerization in the presence of a titanium compound catalyst are used. This is because the unique coloring phenomenon does not result from the degradation of polyester but occurs only in a blend of the polycarbonate resin with the aromatic polyester resin obtained by using the above catalyst. The titanium compound as catalyst is known, and examples may include titanium tetrabutoxide, titanium tetraisopropoxide, titanium tetrachloride, titanium oxalate, titanium potassium oxalate, amorphous titanium dioxide, potassium titanate fluoride. The amount of the titanium compound catalyst is 0.001 to 1 mol %, preferably 0.005 to 0.5 mol %, based on the polyester.

The amount of the polycarbonate is 5 to 100 parts by weight, preferably 10 to 70 parts by weight, per 100 parts by weight of the aromatic polyester resin. If the proportion of the polycarbonate is less than 5 parts by weight, the heat distortion temperature of the aromatic polyester increases only slightly to an infeasible degree. If it exceeds 100 parts by weight, the excellent properties of the polyester, such as moldability or chemical resistance, are deteriorated.

The phosphorus compound (3) is used in an amount sufficient to inhibit the coloration of the blend of the polyester resin (1) and the polycarbonate resin (2). Examples of the phosphorus compound include phosphoric acid; $C_1$–$C_{20}$ alkyl esters of phosphoric acid such as trimethyl phosphate, methyldiethyl phosphate, triethyl phosphate, triisopropyl phosphate, tributyl phosphate, tripentyl phosphate, tricyclohexyl phosphate, trihexyl phosphate, trioctyl phosphate, tridecyl phosphate, trilauryl phosphate, trimyristyl phosphate, tristearyl phosphate, trimethoxyphosphate, tri(hydroxyethyl) phosphate, tri($\delta$-hydroxybutyl) phosphate or tri($\omega$-hydroxy-n-hexyl) phosphate; $C_6$–$C_{20}$ aryl esters of phosphoric acid such as triphenyl phosphate, trinaphthyl phosphate or tri(p-phenylphenyl) phosphate; aralkyl esters of phosphoric acid such as tribenzyl phosphate; phosphorous acid; $C_1$–$C_{20}$ alkyl esters of phosphorous acid such as trimethyl phosphite, triethyl phosphite, tributyl phosphite, tripentyl phosphite, trihexyl phosphite, tricyclohexyl phosphite, trioctyl phosphite, tridecyl phosphite, trilauryl phosphite, tristearyl phosphite, tri(hydroxyethyl) phosphite, tri($\delta$-hydroxybutyl) phosphite or tri($\omega$-hydroxy-n-hexyl) phosphite; $C_6$–$C_{20}$ aryl esters of phosphorous acid such as triphenyl phosphite, trinaphthyl phosphite, tri(p-phenylphenyl) phosphite, tri(tolyl) phosphite or tricumenyl phosphite; $C_7$–$C_{20}$ aralkyl esters of phosphorous acid such as tribenzyl phosphite or triphenetyl phosphite; phosphonic acid; substituted phosphonic acid such as phenylphosphonic acid, methylphosphonic acid, ethylphosphonic acid; phosphonic acid esters such as phenyl phenylphosphonate, diphenyl phenylphosphonate, phenyl phosphonate, dimethyl methylphosphonate, butyl butylphosphonate, phenyl hexylphosphonate, diphenyl methylphosphonate or

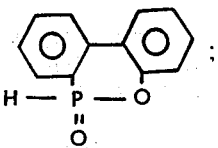

phosphinic acid; mono- or disubstituted phosphinic acid such as phenylphosphinic acid, dimethylphosphinic acid, diphenylphosphinic acid; phosphinic acid esters such as methyl dimethylphosphinate, phenyl methylphosphinate, phenyl diphenylphosphinate, phenyl diphenylphosphonite; methyl diphenylphosphinite or triphenyl phosphine; triphenyl phosphine oxide or phosphorus compound of the formula

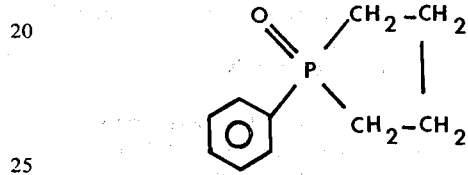

There can also be used the metal salts of phosphorus compounds, for example, salts formed between compounds selected from phosphoric acid, phosphorous acid, phosphonic acid, phosphonous acid, phosphinic acid, phosphinous acid, substituted phosphonic acid, di- or mono-substituted phosphonous acid and metals selected from lithium, sodium, potassium, rubidium, cesium, magnesium, calcium, strontium, barium, manganese, iron, cobalt, nickel, zinc, silver, cadmium, aluminum, tin, and lead. Of these, the alkali metal salts and alkaline earth metal salts are especially preferred. Specific examples of the metal salts include monosodium phosphate, disodium phosphate, trisodium phosphate, calcium phosphate, aluminum phosphate, monopotassium phosphite, calcium phosphite, magnesium phosphite, disodium phenylphosphonate, magnesium phenylphosphonate, monosodium methylphosphonite, potassium phosphonate, and sodium diphenylphosphonite.

The amount of the phosphorus compound or its metal salt varies according to its type, but is one sufficient for inhibiting the coloration. This amount is smaller than one required to impart fire retardancy to the polyester. Usually, the amount is 0.01 to 3 parts by weight, preferably 0.01 to 1 part by weight, especially 0.02 to 0.5 part by weight, per 100 parts by weight of the aromatic polyester resin.

The composition of this invention is prepared by mixing the polyester, the polycarbonate and the phosphorus compound at any desired stage before the completion of melt-shaping. For example, the following methods can be used.

1. The phosphorus compound or its metal salt is added to a raw material for preparing the polyester or to an intermediate product formed during the polymerization, and the resulting polyester is melt-mixed with the polycarbonate during molding or before.

2. The phosphorus compound or its metal salt is adhered to or mixed with the polyester after polymerization, and they are melt-mixed with the polycarbonate during or before molding.

3. The phosphorus compound is mixed with or adhered to the polycarbonate, and they are melt-mixed with the polyester during or before molding.

4. The polyester, the polycarbonate, and the phosphorus compound are simultaneously mixed during or before molding.

5. A solution of the polyester, the polycarbonate and the phosphorus compound in a solvent is prepared, and after uniform mixing, the solvent is removed.

In order to inhibit any change in properties as a result of an inter-reaction of the polyester with the polycarbonate during melt-mixing, it is preferred to limit the melt-mixing time to not more than 30 minutes, especially to not more than 10 minutes.

The composition of this invention can further contain various additives such as an anti-oxidant, a light stabilizer, a pigment, a fire-retardant, a crystallization promotor, a reinforcing agent (for example, glass fibers), a filler, or a mold releasing agent.

A composition of this invention has a high heat distortion temperature, and superior abrasion resistance, chemical resistance, and color.

The following Examples illustrate the present invention in greater detail. In the Examples, all parts are by weight. The intrinsic viscosity, the heat distortion temperature, and the color were measured by the following methods.

Intrinsic viscosity [η]

Measured on an o-chlorophenol solution at 35°C.

Heat-distortion temperature

Measured in accordance with ASTM D-648 using a test piece (5 × ¼ × ½) under a load of 264 p.s.i.

Color

Cylindrical pellets (average diameter of about 1.5 mm and average length of about 5 mm) were maintained in air at 140°C. for 1 hour, and then L, a and b values of the pellets were measured using a Hunter-type color meter. The values indicated are average values of 10 replicates.

EXAMPLES 1 TO 17 AND COMPARATIVE EXAMPLES 1 TO 3

Preparation of poly(tetramethylene terephthalate)

A reactor equipped with a stirrer was charged with 194 parts of dimethyl terephthalate, 135 parts of tetramethylene glycol and 0.068 part of titanium tetrabutoxide, and heated to 150° to 220°C. Methanol formed as a result of the reaction was distilled off out of the reactor throughout the reaction. Substantially the theoretical amount of methanol was distilled off. The reaction temperature was gradually raised to 250°C. The reaction mixture was maintained at this temperature, and the pressure of the inside of the reactor was gradually reduced to about 0.5 mmHg over the course of 1 hour. The reaction was carried out at this pressure for an additional one hour. The resulting poly (tetramethylene terephthalate) had an intrinsic viscosity of 0.72.

Preparation of composition

The resulting polytetramethylene terephthalate was dried for 5 hours at 120°C., and then mixed with a polycarbonate of 2,2-bis(4-hydroxy phenyl) propane having an intrinsic viscosity of 0.68, and each of the phosphorus compounds indicated in Table 1 in the amounts indicated in Table 1. The mixture obtained was melt-mixed and extruded at 250°C. using an extruder to form pellets (cylindrical pellets each having a diameter of about 1.5 mm and a length of about 5 mm). The color and intrinsic viscosity of the pellets, and the heat distortion temperature and elongation of test pieces obtained by melt-shaping the pellets are shown in Table 1.

For comparison, the above procedure was repeated except that the phosphorus compound was not added (Comparative Example 1), a larger amount of the phosphorus compound was added (Comparative Example 2), and an antioxidant was added instead of the phosphorus compound (Comparative Example 3). The results are also shown in Table 1.

Table 1

| | Composition | | | | Properties of Composition | | | | | |
|---|---|---|---|---|---|---|---|---|---|---|
| | Polytetra-methylene tere-phthalate (parts) | Poly-carbonate (parts) | Phosphorus compound | | Color | | | Intrinsic viscosity [η] | Heat distortion temperature (°C) | Elongation (%) |
| | | | Type | Amount (parts) | L | a | b | | | |
| Example 1 | 90 | 10 | triphenyl phosphite | 0.5 | 71.8 | −1.0 | 3.8 | 0.71 | 70 | 310 |
| Example 2 | 80 | 20 | Phosphorous acid | 0.05 | 72.9 | −0.9 | 3.2 | 0.71 | 86 | 280 |
| Example 3 | 70 | 30 | trimethyl phosphite | 0.3 | 70.4 | −0.5 | 3.9 | 0.70 | 105 | 210 |
| Example 4 | 70 | 30 | phosphoric acid | 0.02 | 72.1 | −0.2 | 4.1 | 0.69 | 104 | 220 |
| Example 5 | 70 | 30 | trimethyl phosphate | 0.2 | 74.2 | −0.1 | 3.7 | 0.70 | 105 | 215 |
| Example 6 | 70 | 30 | phenylphos-phonic acid | 0.05 | 75.2 | −1.1 | 5.1 | 0.70 | 105 | 220 |
| Example 7 | 60 | 40 | triphenyl phosphine | 0.5 | 76.8 | −1.2 | 5.3 | 0.69 | 110 | 200 |
| Example 8 | 90 | 10 | monosodium phosphate | 0.05 | 73.2 | −0.9 | 3.2 | 0.70 | 71 | 300 |
| Example 9 | 80 | 20 | aluminum phosphite | 0.10 | 73.2 | −0.8 | 3.1 | 0.71 | 86 | 290 |
| Example 10 | 70 | 30 | disodium phosphate | 0.05 | 76.5 | −1.1 | 3.7 | 0.70 | 104 | 230 |
| Example 11 | 70 | 30 | monosodium phosphite | 0.3 | 76.8 | −0.3 | 3.5 | 0.71 | 105 | 225 |
| Example 12 | 70 | 30 | disodium | 0.5 | 73.1 | −0.3 | 3.8 | 0.69 | 105 | 225 |

Table 1-continued

| | Composition | | | | Properties of Composition | | | | | |
|---|---|---|---|---|---|---|---|---|---|---|
| | Polytetra-methylene tere-phthalate (parts) | Poly-carbonate (parts) | Phosphorus compound | | Color | | | Intrin-sic vis-cosity [η] | Heat dis-tortion tem-perature (°C) | Elon-gation (%) |
| | | | Type | Amount (parts) | L | a | b | | | |
| Example 13 | 70 | 30 | phosphite magnesium phenyl-phosphonate | 0.1 | 77.9 | −1.0 | 3.8 | 0.69 | 104 | 230 |
| Example 14 | 70 | 30 | potassium phosphinate | 0.05 | 78.2 | −0.2 | 4.2 | 0.70 | 105 | 225 |
| Example 15 | 60 | 40 | sodium di-methyl-phosphinite | 0.1 | 75.2 | −1.1 | 3.7 | 0.68 | 112 | 220 |
| Example 16 | 60 | 40 | tribenzyl phosphite | 0.05 | 74.3 | −0.2 | 3.5 | 0.68 | 111 | 222 |
| Example 17 | 70 | 30 | tri(hydroxy-ethyl) phosphate | 0.1 | 74.1 | −0.2 | 3.4 | 0.70 | 104 | 215 |
| Comparative Example 1 | 70 | 30 | — | — | 70.3 | 0.4 | 13.3 | 0.70 | 104 | 220 |
| Comparative Example 2 | 70 | 30 | disodium phosphate | 3.5 | 72.3 | −0.5 | 3.8 | 0.69 | 104 | 8 |
| Comparative Example 3 | 70 | 30 | 2,6-di-t-butyl phenol | 1.0 | 69.5 | 0.5 | 16.3 | 0.70 | 105 | 225 |

It is seen from the above table that the composition not containing the phosphorus compound has a high b value and is strongly yellowish, whereas the composition of this invention containing the phosphorus compound has a markedly reduced b value in spite of having substantially the same intrinsic viscosity as the composition not containing the phosphorus compound, and exhibits an improved color. Furthermore, it can be seen from the table that the composition not containing the phosphorus compound assumes strongly yellowish color in spite of showing no substantial reduction in intrinsic viscosity. Accordingly, this demonstrates that the coloration of the composition does not occur as a result of the heat degeneration of the composition, but is caused by mixing the polycarbonate with the poly(-tetramethylene terephthalate).

The Table further shows that when the phosphorus acid is added in a larger amount than that specified in the present invention, the physical property (elongation) of the composition is extremely reduced, and that a stabilizer such as 2,6-di-t-butyl phenol does not produce the effect of the present invention.

EXAMPLE 18

0.2 part of triphenyl phosphite was added to 100 parts of the composition of Comparative Example 1, and the mixture was melt-mixed and extruded at 250°C. using an extruder to form pellets (cylindrical pellets each having a diameter of about 1.5 mm, and a length of about 5 mm). The color of the pellets was remarkably improved over the pellets obtained in Comparative Example 1, with an L value of 70.5, an a value of 0.9, and a b value of 5.1.

EXAMPLE 19 AND COMPARATIVE EXAMPLE 4

80 Parts of poly(tetramethylene-2,6-naphthalene dicarboxylate) (having an intrinsic viscosity of 0.75 and containing about 0.03 mol %, based on polymer, of titanium tetrabutoxide), 20 parts of a polycarbonate of 2,2-bis(4-hydroxyphenyl)propane (intrinsic viscosity 0.68), and 0.1 part of monosodium phosphate were well mixed, and extruded at 270°C. using an extruder to form pellets (cylindrical pellets each having a diameter of about 1.5 mm and a length of about 5 mm).

The pellets obtained had a L value of 78.2, an a value of 1.0, and a b value of 2.7, and also an intrinsic viscosity of 0.73.

For comparison, the above procedure was repeated except that the monosodium phosphate was not used. The pellets had an intrinsic viscosity of 0.73, and an L value of 69.8, an a value of 0.5, and a b value of 12.5. This indicated that the color of the pellets was far inferior to that of the pellets obtained in accordance with the present invention.

What we claim is:

1. An aromatic polyester resin composition with inhibited coloration, said composition comprising
   1. 100 parts by weight of an aromatic polyester resin derived from a glycol component at least 70 mol % of which consists of tetramethylene glycol and an acid component at least 70 mol % of which consists of an aromatic dicarboxylic acid which are polymerized with a titanium compound catalyst,
   2. a 0.01 to 3 parts by weight per 100 parts by weight of the aromatic polyester resin of at least one phosphorus compound which is liquid or solid at room temperature selected from the group consisting of phosphorus compounds of the following formula

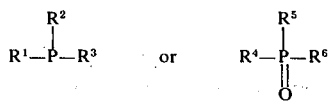

wherein each of $R^1$, $R^2$ and $R^3$, and each of $R^4$, $R^5$ and $R^6$ represent a hydrogen atom, an alkyl group containing 1 to 20 carbon atoms, an aryl group containing 6 to 20 carbon atoms, an aralkyl group containing 7 to 20 carbon atoms, or —OR group in which R is a hydrogen atom, an alkyl group containing 1 to 20 carbon atoms, an aryl group containing 6 to 20 carbon atoms, an aralkyl group containing 7 to 20 carbon atoms; $R^1$, $R^2$ and $R^3$, or $R^4$, $R^5$ and $R^6$ may be different from each other, or at least two of $R^1$, $R^2$ and $R^3$ or $R^4$, $R^5$ and $R^6$ may be the same, or at least two of $R^1$, $R^2$ and $R^3$, or $R^4$, $R^5$ and $R^6$ may form a ring, and metal salts of these phosphorus compounds.

2. The composition of claim 1 wherein said coloration inhibiting amount is 0.1 to 0.5 part by weight per 100 parts by weight of the aromatic polyester resin.

3. The composition of claim 1 wherein said phosphorus compound is selected from the group consisting of phosphoric acid, trimethyl phosphate, methyldiethyl phosphate, triethyl phosphate, triisopropyl phosphate, tributyl phosphate, triphenyl phosphate, tribenzyl phosphate, tricyclohexyl phosphate, phosphorous acid, trimethyl phosphite, triethyl phosphite, tributyl phosphite, tri(δ-hydroxybutyl) phosphate, triphenyl phosphite, phosphonic acid, phenylphosphonic acid, phenyl phenylphosphonate, diphenyl phenylphosphonate, phenyl phosphonate, phosphinic acid, phenylphosphinic acid, methyl dimethylphosphinate, phenyl methylphosphinate, triphenyl phosphine, triphenyl phosphine oxide,

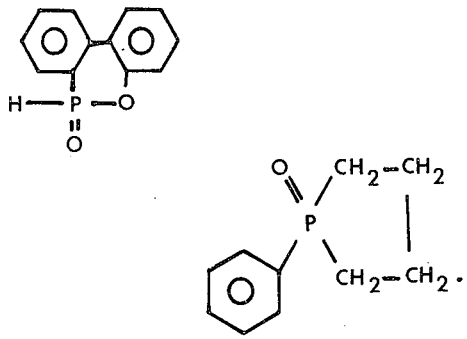

4. The composition of claim 1 wherein said phosphorus compound is a metal salt selected from the group consisting of metal salts formed between compounds selected from the group consisting of phosphoric acid, phosphorous acid, phosphonic acid, phosphonous acid, phosphinic acid, phosphinous acid, phenylphosphonic acid, methylphosphonic acid and diphenyl phosphinous acid and metals selected from the group consisting of lithium, sodium, potassium, rubidium, cesium, magnesium, calcium, strontium, barium, manganese, iron, cobalt, nickel, zinc, silver, cadmium, aluminum, tin, and lead.

5. A method for inhibiting the coloration and improving the heat distortion temperature of an aromatic polyester resin composition which includes 1. 100 parts by weight of an aromatic polyester resin derived from a glycol component at least 70 mol % of which consists of tetramethylene glycol and an acid component at least 70 mol % of which consists of an aromatic dicarboxylic acid which are polymerized with a titanium compound catalyst and 2. 5 to 100 parts by weight of a polycarbonate resin, which comprises incorporating a coloration inhibiting amount of from about 0.1 to 0.5 parts by weight per 100 parts by weight of the aromatic polyester resin of at least one phosphorus compound which is liquid or solid at room temperature selected from the group consisting of phosphorus compounds of the following formula

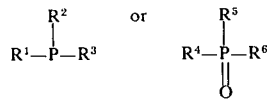

wherein each of $R^1$, $R^2$ and $R^3$, and each of $R^4$, $R^5$ and $R^6$ represent a hydrogen atom, an alkyl group containing 1 to 20 carbon atoms, an aryl group containing 6 to 20 carbon atoms, an aralkyl group containing 7 to 20 carbon atoms, or —OR group in which R is a hydrogen atom, an alkyl group containing 1 to 20 carbon atoms, an aryl group containing 6 to 20 carbon atoms, an aralkyl group containing 7 to 20 carbon atoms; $R^1$, $R^2$ and $R^3$, or $R^4$, $R^5$ and $R^6$ may be different from each other, or at least two of $R^1$, $R^2$ and $R^3$ or $R^4$, $R^5$ and $R^6$ may be the same, or at least two of $R^1$, $R^2$ and $R^3$, or $R^4$, $R^5$ and $R^6$ may form a ring, and metal salts of these phosphorus compounds in an aromatic polyester resin composition comprising (1) 100 parts by weight of an aromatic polyester resin derived from a glycol component at least 70 mol % of which consists of tetramethylene glycol and an acid component at least 70 mol % of which consists of an aromatic dicarboxylic acid which are polymerized with a titanium compound catalyst, and (2) 5 to 100 parts by weight of a polycarbonate resin, before the end of melt-shaping of said composition.

6. The composition of claim 1 wherein said composition includes from 10 to 70 parts by weight of said polycarbonate resin.

7. The method of claim 5 wherein said polyester resin composition includes from 10 to 70 parts by weight of said polycarbonate resin.

* * * * *

UNITED STATES PATENT AND TRADEMARK OFFICE
CERTIFICATE OF CORRECTION

PATENT NO. : 3,953,539
DATED : April 27, 1976
INVENTOR(S) : KAWASE, ET AL.

It is certified that error appears in the above-identified patent and that said Letters Patent are hereby corrected as shown below:

Claim 1, after line 8, insert the following subparagraph:

-- 2. 5 to 100 parts by weight of a polycarbonate resin, and --

Claim 1, line 9, delete "2. a", insert -- 3. --

Claim 3, column 9, line 24, insert -- and -- between the two formulae.

Signed and Sealed this

Thirteenth Day of July 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,953,539
DATED : April 27, 1976
INVENTOR(S) : KAWASE, ET AL.

It is certified that error appears in the above-identified patent and that said Letters Patent are hereby corrected as shown below:

Claim 5, column 10, line 7, delete "0.1 to 0.5", insert --0.01 to 3--.

Signed and Sealed this

Fourteenth Day of November 1978

[SEAL]

Attest:

RUTH C. MASON
Attesting Officer

DONALD W. BANNER
Commissioner of Patents and Trademarks